US012682081B2

(12) United States Patent (10) Patent No.: US 12,682,081 B2
Pyle (45) Date of Patent: Jul. 14, 2026

(54) KEY DEPRECATION WITHOUT CERTIFICATE REVOCATION

(71) Applicant: Schneider Electric USA, Inc., Andover, MA (US)

(72) Inventor: Michael Pyle, Hermitage, TN (US)

(73) Assignee: Schneider Electric USA, Inc., Boston, MA (US)

( * ) Notice: Subject to any disclaimer, the term of this patent is extended or adjusted under 35 U.S.C. 154(b) by 238 days.

(21) Appl. No.: 18/409,878

(22) Filed: Jan. 11, 2024

(65) Prior Publication Data

US 2025/0232044 A1 Jul. 17, 2025

(51) Int. Cl.
G06F 21/60 (2013.01)
G06F 21/57 (2013.01)
G06F 21/64 (2013.01)
(52) U.S. Cl.
CPC .......... G06F 21/602 (2013.01); G06F 21/575 (2013.01); G06F 21/64 (2013.01)
(58) Field of Classification Search
CPC ...... G06F 21/602; G06F 21/575; G06F 21/64; G06F 21/572
See application file for complete search history.

(56) References Cited

U.S. PATENT DOCUMENTS 8,214,653 B1 * 7/2012 Marr .......................... G06F 8/65
713/150
12,197,631 B2 * 1/2025 Caraccio ................. G06F 21/79

12,346,448 B2 * 7/2025 Park ...................... G06F 21/572
2016/0191253 A1 * 6/2016 Pyle .................... H04L 63/0823
380/28
2019/0163910 A1 * 5/2019 Moon ...................... G06F 21/54
2022/0207193 A1 * 6/2022 Caraccio ............. G11C 11/2273
2023/0274002 A1 * 8/2023 Orlando ................ H04L 9/0891
713/189
2025/0053659 A1 * 2/2025 Asbe ...................... G06F 21/575

OTHER PUBLICATIONS

International Search Report and Written Opinion dated Mar. 14, 2025 for corresponding International Patent Application No. PCT/US2025/010995, 13 pages.

* cited by examiner

*Primary Examiner* — Mohammed Waliullah
(74) *Attorney, Agent, or Firm* — Wolf, Greenfield & Sacks, P.C.

(57) ABSTRACT

Embodiments described herein provide techniques for securely validating firmware on a device using keys and providing a mechanism for deprecating such keys when a traditional certificate authority is unavailable or otherwise cannot be used. When a first firmware package is installed on the device, a first public key in a first secure memory key location is associated with an active status. Responsive to installation of a second firmware package on the device, a second public key in a second secure memory key location on the device is associated with an active status. During a boot-up operation on the device, embodiments determine to use the second public key to validate the second firmware package by starting at a predefined secure memory key location and scanning backwards until a status of active is identified. The second firmware package on the device is then validated using the second public key.

23 Claims, 8 Drawing Sheets

200

| Memory Location | Public Key (ECC) | Status |
|---|---|---|
| 1 | %[,5k)uoR)}S10]@ngub+*D:OQ;%50oU)q0 | ACTIVE LOCKED |
| 2 | ffffffffffffffffffffffffffffffffffffff | INACTIVE UNLOCKED |
| 3 (minimum) | ffffffffffffffffffffffffffffffffffffff | INACTIVE UNLOCKED |
| 4 ... | ffffffffffffffffffffffffffffffffffffff | INACTIVE UNLOCKED |
| ... | ffffffffffffffffffffffffffffffffffffff | INACTIVE UNLOCKED |
| n | ffffffffffffffffffffffffffffffffffffff | INACTIVE UNLOCKED |

| Memory Location | Public Key (ECC) | Status |
|---|---|---|
| 1 | %[,5k)uoR)}S10]@ngub+*D:OQ;%50oU)q0 | ACTIVE LOCKED |
| 2 | )<~SGVCd3pBD[zl_H-Cank@HuJP,%/hi<cb | ACTIVE LOCKED |
| 3 | ffffffffffffffffffffffffffffff | INACTIVE UNLOCKED |
| 4 ... | ffffffffffffffffffffffffffffff | INACTIVE UNLOCKED |
| ... | ffffffffffffffffffffffffffffff | INACTIVE UNLOCKED |
| n | ffffffffffffffffffffffffffffff | INACTIVE UNLOCKED |

| Memory Location | Public Key (ECC) | Slot Status | Key Status |
|---|---|---|---|
| 1 | %[,5k)uoR)}S10]@ngub+*D·OQ;%50oU)q0 | LOCKED | ACTIVE (locked) |
| 2 | )<~SGVCd3pBD[zl_H-Cank@HuJP.%/hi<cb | LOCKED | INACTIVE |
| 3 (minimum) | S};s:f64E(N/#?(H(=MTe(5DPqqRbWo?qK | LOCKED | INACTIVE |
| 4 ... | 5yk6.$mWCs}B-v=~v5|,VI#9A_VIYE$gbu& | LOCKED | INACTIVE |
| ... | -$5Gu^1j^-5#|8VOc6La2y8C2l8A2@QU^3[ | LOCKED | INACTIVE |
| n | #N<Wyg~L2eyXO>7Z%M?vRWiJj9I~h5qgCjw | LOCKED | INACTIVE |

| Memory Location $460_{1-n}$ | Public Key (ECC) $470_{1-n}$ | Slot Status $480_{1-n}$ | Key Status $490_{1-n}$ |
|---|---|---|---|
| 1 | %[,5k)uoR)}S10]@ngub+*D:OQ;%50oU)q0 | LOCKED | ACTIVE (locked) |
| 2 | )<~SGVCd3pBD[zl_H-Cank@HuJP.%/hi<cb | LOCKED | ACTIVE (locked) |
| 3 (minimum) | ,S};s;f64E(N/#?(H(=MTe(5DPqqRbWo?qK | LOCKED | INACTIVE |
| 4 ... | 5yk6.$mWCs}B-v=-v5],VJ#9A_VlYE$gbu& | LOCKED | INACTIVE |
| ... | -$5Gu^1j^-5#|8VOc6La2y8C218A2@QU^3l | LOCKED | INACTIVE |
| n | #N<Wyg~L2eyXO>7Z%M?vRWiJi9l~h5qgCjw | LOCKED | INACTIVE |

FIG. 4B

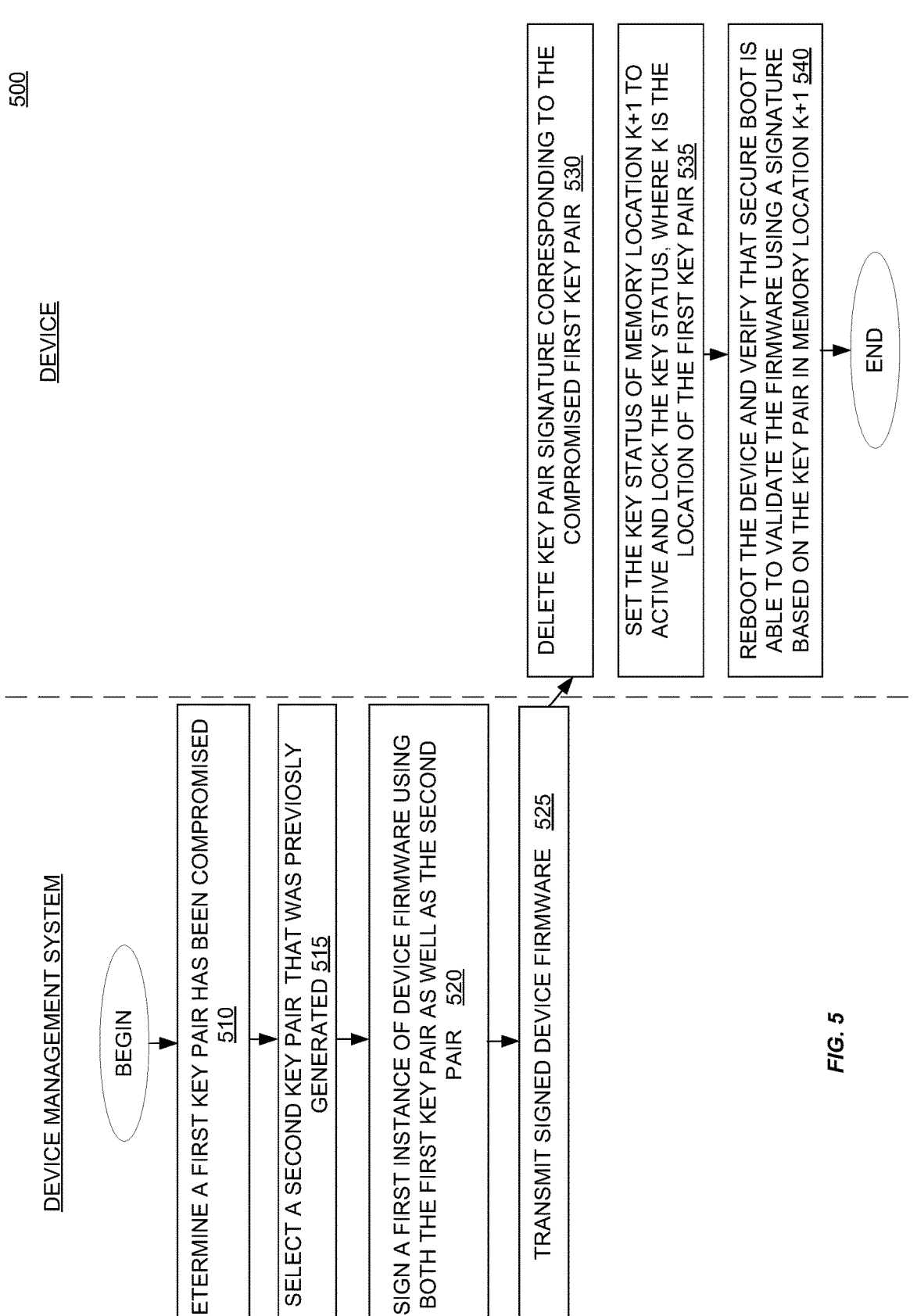

500

DEVICE

DEVICE MANAGEMENT SYSTEM

BEGIN

DETERMINE A FIRST KEY PAIR HAS BEEN COMPROMISED 510

SELECT A SECOND KEY PAIR THAT WAS PREVIOSLY GENERATED 515

SIGN A FIRST INSTANCE OF DEVICE FIRMWARE USING BOTH THE FIRST KEY PAIR AS WELL AS THE SECOND PAIR 520

TRANSMIT SIGNED DEVICE FIRMWARE 525

DELETE KEY PAIR SIGNATURE CORRESPONDING TO THE COMPROMISED FIRST KEY PAIR 530

SET THE KEY STATUS OF MEMORY LOCATION K+1 TO ACTIVE AND LOCK THE KEY STATUS, WHERE K IS THE LOCATION OF THE FIRST KEY PAIR 535

REBOOT THE DEVICE AND VERIFY THAT SECURE BOOT IS ABLE TO VALIDATE THE FIRMWARE USING A SIGNATURE BASED ON THE KEY PAIR IN MEMORY LOCATION K+1 540

END

FIG. 5

600

BEGIN

WHEN A FIRST FIRMWARE PACKAGE IS INSTALLED ON A FIRST DEVICE, ASSOCIATING A FIRST PUBLIC KEY IN A FIRST SECURE MEMORY KEY LOCATION WITH AN ACTIVE STATUS, WHEREIN THE ACTIVE STATUS INDICATES THAT THE PUBLIC KEY WILL BE USED DURING BOOT OPERATIONS TO VALIDATE A SIGNATURE OF THE FIRST FIRMWARE PACKAGE ON THE FIRST DEVICE 610

RESPONSIVE TO INSTALLATION OF A SECOND FIRMWARE PACKAGE ON THE FIRST DEVICE, ASSOCIATING A SECOND PUBLIC KEY IN A SECOND SECURE MEMORY KEY LOCATION ON THE FIRST DEVICE WITH AN ACTIVE STATUS, WHEREIN THE SECOND SECURE MEMORY KEY LOCATION IS IMMEDIATELY ADJACENT TO THE FIRST SECURE MEMORY KEY LOCATION 615

DURING A BOOT-UP OPERATION ON THE FIRST DEVICE, DETERMINING TO USE THE SECOND PUBLIC KEY TO VALIDATE THE SECOND FIRMWARE PACKAGE BY STARTING AT A PREDEFINED SECURE MEMORY KEY LOCATION AND SCANNING BACKWARDS UNTIL A STATUS OF ACTIVE IS IDENTIFIED 620

VALIDATE THE SECOND FIRMWARE PACKAGE ON THE FIRST DEVICE USING THE SECOND PUBLIC KEY 625

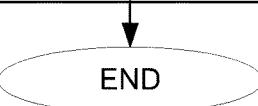

END

*FIG. 6*

KEY DEPRECATION WITHOUT CERTIFICATE REVOCATION

TECHNICAL FIELD

The present disclosure relates to device security, and more particularly, to techniques for managing key pairs used in the operation of secured firmware for devices.

BACKGROUND

Connected devices of a variety of types are becoming increasingly common in modern homes, factories and many other environments. While networks of connected devices offer many benefits and improvements over conventional environments, such environments present new network security challenges. One challenge that such devices face is what to do if the security of a device is ever compromised and how security credentials can be deprecated over time and new security credentials can be securely replaced in the device as needed. A particular technical challenge exists for managing the security of devices that may lack the computing resources needed to implement more involved solutions, as is the case with many Internet of Things (IoT) devices and various legacy devices that may lack the computing power and memory resources to execute modern certificate revocation techniques or placed on isolated networks without access to the Internet.

SUMMARY

One embodiment provides a system that includes one or more computer processors and a memory containing computer program code that, when executed by operation of the one or more computer processors, performs an operation. The operation includes, when a first firmware package is installed on a first device, associating a first public key in a first secure memory key location with an active status. The active status indicates that the public key will be used during boot operations to validate a signature of the first firmware package on the first device. The operation further includes, responsive to installation of a second firmware package on the first device, associating a second public key in a second secure memory key location on the first device with an active status. The second secure memory key location is immediately adjacent to the first secure memory key location. The operation also includes, during a boot-up operation on the first device, determining to use the second public key to validate the second firmware package by starting at a predefined secure memory key location and scanning backwards until a status of active is identified. Additionally, the operation includes validating the second firmware package on the first device using the second public key.

Another embodiment provides a method that includes, when a first firmware package is installed on a first device, associating a first public key in a first secure memory key location with an active status. The method further includes, responsive to installation of a second firmware package on the first device, associating a second public key in a second secure memory key location on the first device with an active status. Additionally, the method includes, during a boot-up operation on the first device, determining to use the second public key to validate the second firmware package by starting at a predefined secure memory key location and scanning until a status of active is identified. The method also includes validating the second firmware package on the first device using the second public key.

Another embodiment provides a non-transitory computer-readable medium containing computer program code that, when executed by operation of one or more computer processors, performs an operation. The operation includes, when a first firmware package is installed on a first device, associating a first public key in a first secure memory key location with an active status. The operation also includes, responsive to installation of a second firmware package on the first device, associating a second public key in a second secure memory key location on the first device with an active status. Additionally, the operation includes, during a boot-up operation on the first device, determining to use the second public key to validate the second firmware package by starting at a predefined secure memory key location and scanning backwards until a status of active is identified. The operation further includes, upon unsuccessfully validating the second firmware package on the first device using the second public key, halting the boot-up operation of the first device and generating a notification.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

FIGS. 2A-B are block diagrams illustrating secured memory key stores, according to one embodiment described herein.

FIGS. 4A-B are block diagrams illustrating secured memory key stores, according to one embodiment described herein.

FIG. 5 is a flow chart illustrating an alternate method for deprecating a compromised key pair used in a secure boot operation for a device, according to one embodiment described herein.

FIG. 6 is a flow chart illustrating a method for validating firmware using an update key pair, according to one embodiment described herein.

DETAILED DESCRIPTION

Figure 1:
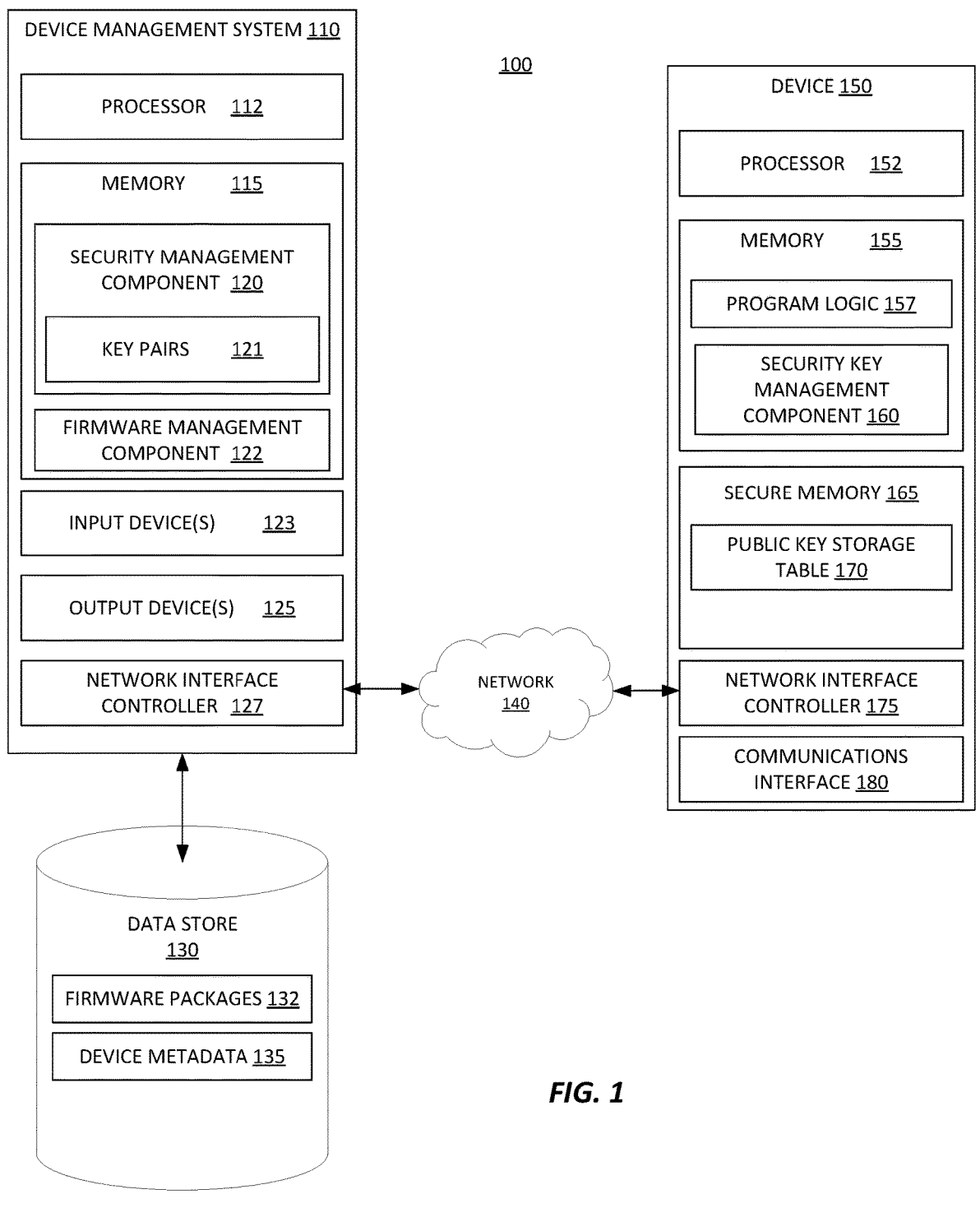
FIG. 1 is a block diagram illustrating a system configured with a security management component, according to one embodiment described herein.

FIG. 1 is a block diagram illustrating a system configured with a security management component, according to one embodiment described herein. As shown, the system 100 includes a device management system 110 and a device 150, interconnected via a network 140. The device management system 110 includes a processor 112, a memory 115, one or more input devices 124, one or more output devices 125 and a network interface controller 127. The memory 115 includes a security management component 120 and a firmware management component 123.

Generally, the security management component 120 is configured to sign firmware packages 132 managed by the firmware management component 122 using one or more certificates 121 corresponding to one or more key pairs 122. The security management component 120 can then transmit the signed firmware packages 132 to the device 150 to be installed and executed on the device 150. In some instances, the security management component 120 may determine that a particular certificate has been compromised (e.g., if the key pair corresponding to the particular certificate has been compromised) or, for other reasons, it is desirable to transition from using the particular certificate to a new certificate (e.g., the active certificate could be updated periodically as a precautionary measure over the lifetime of the device 150).

The device 150 includes a processor 152, a memory 155, a secure memory 165, a network interface controller 175 and a communications interface 180. The memory 155 contains program logic 157, a certificate management component 160, a certificate deprecation list 163 and a certificate trust store 164. The secure memory 165 contains a certificate storage table 170. Generally, the program logic 157 represents any application-specific program logic that resides on the device 150 and generally relates to the overall purpose of the device 150. For example, a particular automation device 150 within an industrial automation environment may have program logic 157 that relates to the function of the automation device within the industrial automation system. As another example, an energy management device 150 within a residential environment may be configured with program logic 157 configured to report on energy management metrics, to send notifications when a circuit breaker within the device 150 has tripped, or more generally any other functions that may be appropriate in a residential energy management context. Of course, such examples are for illustrative purposes only, and more generally any program logic 157 can be used for any of a variety of different environments and contexts, consistent with the functionality described herein.

Additionally, the device management system 110 is communicatively coupled to a data store 130. In the depicted embodiment, the data store 130 includes firmware packages 132 and device metadata 135. Generally, the firmware packages 132 contain various versions of firmware packages configured to be installed on the device 150. The device metadata 135 generally contains data describing the device 150 and attributes thereof. Examples of such device metadata 135 can include, without limitation, a device identifier corresponding to the device 150, a network address corresponding to the device 150, a model number of the device 150, a device type of the device 150, a manufacture date of the device 150, a current version of firmware installed on the device 150, and so on.

In one embodiment, the security management component 120 can sign a first firmware package using a first certificate from the certificates 121. Generally, each of the certificates 121 corresponds to a respective one of the key pairs 122, such that the certificates 121 are procedurally generated using the key pairs 122. For example, the public key from one of the key pairs 122 could be used.

Generally, the key pairs 121 refer to pairs of mathematically related keys that can be used to encrypt data, such as a public key and a private key. As an example, the key pairs 121 can be generated according to a Rivest-Shamir-Adleman (RSA) cryptosystem, such that the public key can be used to encrypt data and the corresponding private key can be used for decrypting the data. Additionally, such keys can be used to sign data (e.g., firmware packages 132). In such an embodiment, the private key could be used to sign the data, and the corresponding public key could be to verify the data. As an example, the security management component 120 could sign a first firmware package from the firmware packages 132 using a first private key, and in doing so could generate a hash digest by hashing the first firmware package using the first private key and a hashing algorithm. The security management component 120 could then transmit the first firmware package and the hash digest to the security management component 160 on the device 150. The security management component 160 could then hash the first firmware package using a first public key corresponding to the first private key and could compare the resulting hash digest to the received hash digest to ensure the values match. Upon determining that the generated hash digest value matches the received hash digest value, the security management component 160 could determine that the integrity of the first firmware package has not been compromised (i.e., that the identity of the sender of the first firmware package is confirmed and that the contents of the first firmware package have not changed during transit).

The secure memory 165 contains a public key storage table 170. The security management component 160 is generally configured to use the public key storage table 170 to store public keys used in communications with the device management system 110 and to designate which public key is active at a current moment in time. In one embodiment, the security management component 160 is configured to write public keys to the public key storage table 170 over time (e.g., as keys are received from the security management component 120 of the device management system 110) and to update status information corresponding to the various keys in the public key storage table 170. In a particular embodiment, multiple keys are written to the public key storage table 170 at a particular moment in time (e.g., during an initial configuration of the device 150 by the manufacturer of the device 150 and while the device 150 is still within the manufacturer's control). In such an embodiment, the security management component 160 could be restricted from or otherwise unable to write to the keys within the public key storage table 170 (e.g., the keys are stored in a read-only state) but could instead write to a status field(s) associated with each of the various keys. For instance, as will be discussed in more detail below, the security management component 160 could write to a status field for a particular key, indicating that the key is an active key.

In one embodiment, the keys within the public key storage table 170 are written in a contiguous fashion, e.g., within a series of sequential memory addresses. However, it is contemplated that multiple memory locations within the secure memory 165 could be used to store the public key storage table 170. In such an embodiment, the security management component 160 could be configured to map sequential key indices (e.g., from 0 to n, where n+1 is the total number of keys) to memory addresses in the multiple memory locations. As such, while examples provided herein may refer to sequential positions within the public key storage table 170, it is contemplated that such positions may be within a single physical memory device or could span multiple memory devices.

In a particular embodiment, when a first firmware package is installed on the device 150, the security management component 160 associates a first public key in a first secure memory key location in the public key storage table 170 with an active status. Generally, the active status indicates that the public key will be used during boot operations to validate a signature of the first firmware package on the first device. For example, the security management component 160 could write the first public key to a position k+1 within the public key storage table 170, where k refers to the position of the previous public key used by the security management component 160. Alternatively, if the security management component 160 on the device 150 has not used any keys prior to the first public key, the security management component 160 could write the first public key to a first position within the public key storage table 170.

In one embodiment, where the keys within the public key storage table 170 are not writeable (e.g., where the public keys are stored in a read-only state), the security management component 160 modify a state variable corresponding to the first public key within the public key storage table 170 and could set the state variable to an active status. In one embodiment, the security management component 160 is configured to unlock the state variable corresponding to the first public key prior to modifying the variable, and is further configured to lock the state variable subsequent to modifying the variable.

The security management component 160 could then use the first public key during secure boot operations to verify and validate the program logic 157 (e.g., firmware). For example, the security management component 160 could hash the program logic 157 or data associated with the program logic 157 using the first public key and could compare the resulting hash digest value with a hash digest value received with the program logic 157. If the hash digest values match, the security management component 160 could determine that the program logic 157 has integrity (i.e., that the program logic 157 was received from a known party and was not modified during transmission from the known party) and could allow the device 150 to boot up. In the event the security management component 160 determines that the hash digest values do not match, the security management component 160 could prevent the device 150 from booting into an operational state and could provide feedback (e.g., one or more error messages) indicating that the program logic 157 could not be validated and/or verified.

In various instances, the program logic 157 on the device 150 may be updated by the firmware management component 122 of the device management system 110. For example, the program logic 157 could be updated to a newer version. As another example, the security management component 120 could determine that the first public key is deprecated (e.g., where the integrity of the first public key or the corresponding private key may have been compromised, periodically over time, etc.). Regardless of the reason, a second firmware package of the firmware packages 132 could be generated and could be signed using a second private key from a second key pair. The firmware management component 122 could then transmit the second firmware package along with a corresponding signature value (e.g., a hash digest value) to the security management component 160 on the device 150.

The device 150 could proceed to install the second firmware package (e.g., based on received user input from a user). In response to the installation of a second firmware package on the first device, the security management component 160 could associate a second public key in a second secure memory key location in the public key storage table 170 with an active status. In one embodiment, the second secure memory key location is immediately adjacent to the first secure memory key location. As discussed above, in some embodiments, the security management component 160 could write the second public key to the second secure memory key location. In other embodiments, a plurality of public keys could have already been written to the public key storage table 170 (e.g., while the manufacturer was in control of the device 150) and the security management component 160 could modify a status value within the public key storage table 170 corresponding to the second public key to set the status value to an active state.

During a boot-up operation on the device 150 (e.g., the next boot-up operation following the installation of the second firmware package), the security management component 160 could determine to use the second public key to validate the second firmware package. For example, the security management component 160 could determine to use the second public key by starting at a predefined secure memory key location and scanning backwards until a status of active is identified. In such an embodiment, where the public key storage table 170 spans indices 0 to n, the security management component 160 could begin at position n within the public key storage table 170 and could scan backwards (i.e., towards index 0) until a public key having a corresponding active status is identified.

The security management component 160 could then validate the second firmware package on the first device using the second public key, and upon successfully validating the second firmware package, the security management component 160 could allow the device 150 to continue booting up using the second firmware package. Doing so enables the device 150 to boot in a secure manner using only verified firmware packages, while allowing for keys to be revoked without requiring the device 150 to access a Certificate Authority on an external network (e.g., the Internet). Moreover, embodiments described herein can be used to secure firmware packages on devices that may lack the computing resources (e.g., computer processing unit power, device memory, network connectivity, etc.) to interface directly with an external Certificate Authority.

FIGS. 2A-B is a block diagram illustrating a secured memory key store, according to one embodiment described herein. Generally, the secured memory key store 200 illustrates an instance of the public key storage table 170 in an embodiment where the security management component 160 is configured to write new public keys to the public key storage table 170 as the new public keys and their corresponding firmware are received. As shown, the secured memory key store 200 in FIG. 2A contains a public key $220_1$ having an exemplary value of "%[,5k) uoR)}S10]@ngub+ *D:OQ;%50oU)q0" and stored in memory location 1 $210_1$. Additionally, the public key $220_1$ is associated with a status $230_1$ having a value of ACTIVE and in a locked state. In the depicted embodiment, the public keys $220_{2-n}$ in the locations $210_{2-n}$ are currently in an unused state and have placeholder values of "ffffffffffffffffffffffff", along with a status $230_{2-n}$ of INACTIVE in an unlocked state.

In the depicted embodiment, assume that the security management component 160 on the device containing the secured memory key store 200 wrote the security key $220_1$ to the memory location 1 $210_1$ when a first firmware package was installed on the device. As discussed above, the security management component 160 could be configured to use the currently active security key to verify and validate firmware during secure boot operations. In one embodiment, the security management component 160 is configured to identify the currently active security key by starting at a last position within the public key storage table 170 (i.e., position n in the depicted embodiment) and scanning backwards (i.e., towards the first position within the public key storage table 170) until a key having an active status is identified.

The security management component 160 then determines that the first key identified during the scanning operation having the active status is the currently active key. Of note, while the public key storage table 170 could contain multiple keys each having an active status, the security management component 160 could be configured to designate the first identified key in the scanning operation as the currently active key.

Returning to the depicted embodiment, the security management component 160 could perform the scanning operation and determine that the public key $220_1$ in the memory location 1 $210_1$ is the currently active key on the device. That is, the security management component 160 could begin scanning at the memory location n $210_n$ and could determine that the first key having a corresponding status 230 of ACTIVE is the key $220_1$ in memory location 1 $210_1$. The security management component 160 could then use the public key $220_1$ during secure during boot operations to validate a signature of the first firmware package on the device.

Responsive to the installation of a second firmware package on the first device, the security management component 160 could associate a second public key in a second secure memory key location on the first device with an active status. For example, the security management component 160 could determine that the memory location 2 $210_2$ is immediately adjacent (here, subsequent) to the first secure memory key location $210_1$. In the depicted embodiment, the security management component 160 could then write a corresponding public key to the corresponding public key location $220_2$ within the public key storage table 170. Additionally, the security management component 160 could update the status value $230_2$ to reflect an active status and could lock the status value $230_2$ to prevent further modifications.

These modifications are illustrated in FIG. 2B, where the security management component 160 has written the value of ")<~SGVCd3pBD[zl_H-Cank@HuJP.%/hi<cb" to the public key field $260_2$, and has written the status ACTIVE to the status field $270_2$ and locked the status field to prevent further modifications. For example, the firmware management component 122 of the device management system 110 could have transmitted the public key value of ")<~SGVCd3pBD[zl_H-Cank@HuJP.%/hi<cb" to the device 150, along with the second firmware package.

During a boot-up operation on the device using the second firmware package, the security management component 160 could scan the updated secured memory key store 250 to determine which public key to use to validate the second firmware package. For example, the security management component 160 could begin the scanning operation by starting at a predefined secure memory key location (e.g., the final memory location n) and scanning backwards (i.e., towards the first memory location $210_1$) until a status of active is identified. In the depicted example, the security management component 160 determines that the key $260_2$ is the currently active key. That is, even though both keys $2601$ and $260_2$ have a corresponding status $2701$ and $270_2$ of ACTIVE, the security management component 160 encounters the key $260_2$ first in the exemplary scanning operation and would designate the first-identified key as the currently active key.

The security management component 160 could then validate the second firmware package on the first device using the identified public key $260_2$. In the event the validation operation for the second firmware package is successful, the security management component 160 could allow the boot operation of the device to continue. For example, the security management component 160 could generate a hash of the second firmware package using a hashing algorithm and the public key $260_2$, and could compare the generated hash value with a hash digest value received with the second firmware package (e.g., from the security management component 120 on the device management system 110). If the hash values match, the security management component 160 could determine that the validation operation was successful. On the other hand, in the event the security management component 160 determines the validation operation was not successful, the security management component 160 could prevent the boot operation from completing and could provide a notification, informing the user that the boot operation was unsuccessful due to a signature mismatch for the second firmware package.

Figure 3:
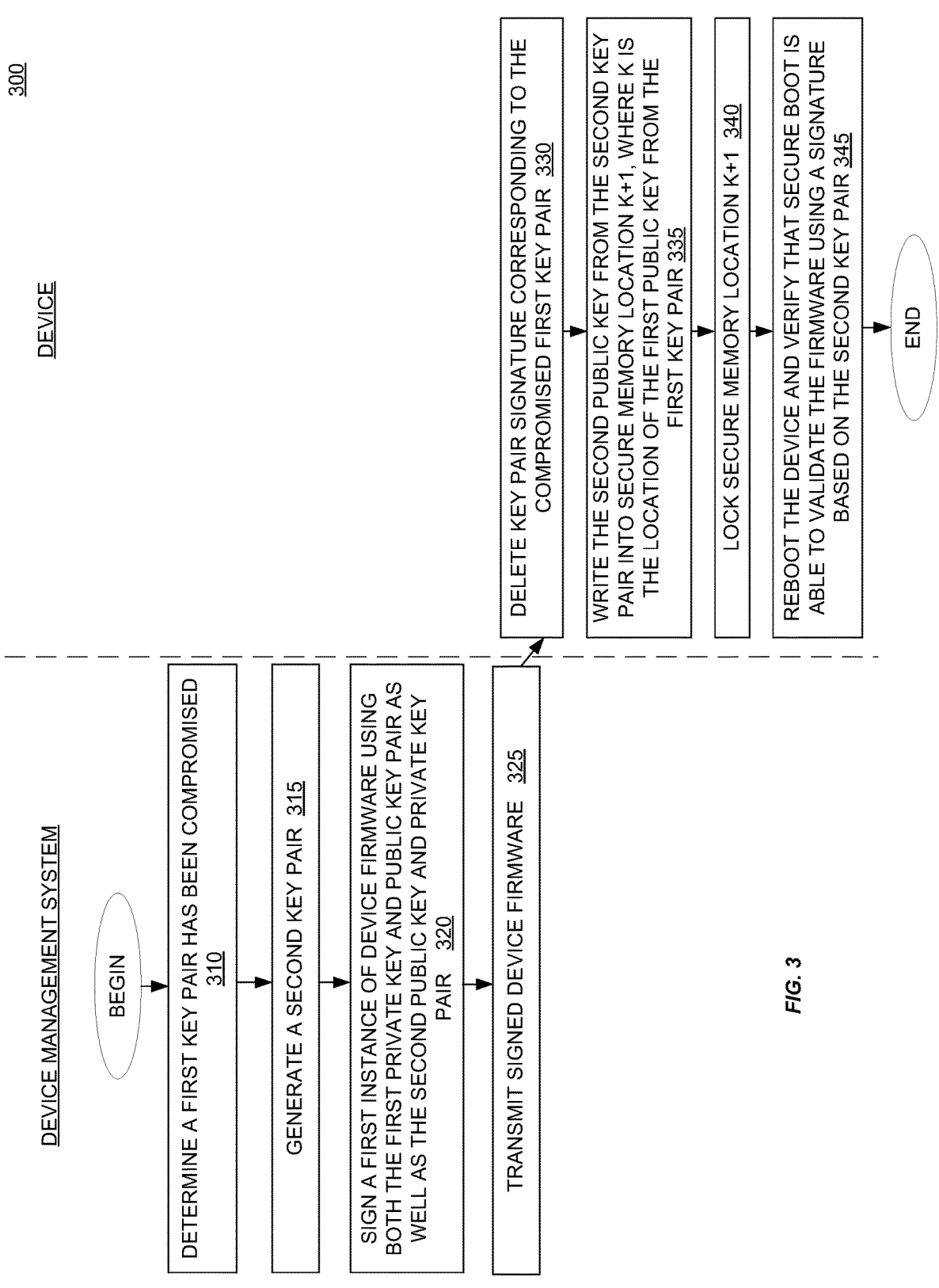
FIG. 3 is a flow chart illustrating a method for deprecating a compromised key pair used in a secure boot operation for a device, according to embodiments described herein.

FIG. 3 is a flow chart illustrating a method for deprecating a compromised key pair used in a secure boot operation for a device, according to embodiments described herein. As shown, the method 300 begins at block 310, where the security management component 120 determines that a first key pair has been compromised 310. The security management component 120 generates a second key pair (block 315) and the security management component 120 signs a first instance of device firmware received from the firmware management component 122 using both the first key pair and the second key pair (block 320). The security management component 120 then transmits the signed device firmware 325 and any associated signature values (e.g., one or more hash digest values produced during the signing process) to the device 150.

Upon receiving the signed device firmware, the security management component 160 deletes a key pair signature corresponding to the compromised first key pair (block 330). Additionally, the security management component 160 writes the second public key from the second key pair into the secure memory at location k+1, where k is the location of the first public key from the first key pair (block 335). In other words, the security management component 160 writes the second public key to the immediately subsequent memory location relative to the location of the previously active key (the first public key, in the depicted example). The security management component 160 locks the secure memory location k+1 once the second public key is written to the secure memory location k+1, thereby preventing future modifications to the second public key within the secure memory (block 340).

Once the secure memory has been updated with the second public key, the security management component 160 reboots the device and verifies that the secure boot operation is able to successfully validate the firmware using a signature based on the second public key (block 345), and the method 300 ends. Advantageously, the method 300 allows a new key to be created after the compromise of the first key pair, which ensures that any attacker that may have compromised the first key pair did not have access to the new key pair (as it was created subsequent to the compromise of the first key pair).

In some embodiments, the security management component 160 could be configured to use a public key storage table 170 that contains multiple read-only public keys. For example, a manufacturer of the device 150 could generate such a public key storage table 170 while the manufacturer is still in control of the device 150 (e.g., at the physical location where the device 150 was manufactured). FIG. 4A is a block diagram illustrating a secured memory key store, according to one embodiment described herein. As shown, the secured memory key store 400 includes memory locations $410_{1-n}$ containing public key values $420_{1-n}$, slot status values $430_{1-n}$ and key status values $440_{1-n}$. In the depicted embodiment, the secured memory key store 400 contains multiple different public key values $420_{1-n}$, which have corresponding status values $430_{1-n}$ of LOCKED. Such public key values could have been written, for example, by a manufacturer of the device during the manufacturing process and could be written in such a way that the public key values cannot be subsequently modified.

In the depicted embodiment, the exemplary public key storage table 400 shows that the public key $420_1$ in the memory location $410_1$ has a key status $440_1$ of ACTIVE, while the remaining public keys $420_{2-n}$ in memory locations $410_{2-n}$ have a corresponding key status $440_{2-n}$ of INACTIVE. As discussed above, the security management component 160 can be configured to scan the public key storage table in reverse order (e.g., starting at memory location $420_n$) and can determine that the first scanned public key having a key status of ACTIVE is the currently active key. Accordingly, in the exemplary public key storage table 400, the security management component 160 could scan the table in reverse order and could determine that the public key in memory location 1 $410_1$ with a value of "%[,5k)uoR)}S10]@ngub+*D:OQ;%50oU)q0" is the currently active key.

The security management component 160 could use the currently active key in performing secure boot operations. For example, during a boot operation using a first firmware package, the security management component 160 could calculate a hash of the first firmware package using a predefined hashing algorithm and the currently active public key. The security management component 160 could then compare the resulting hash value with a hash digest received together with the first firmware package, and the security management component 160 could determine that the first firmware package is verified and validated upon the compared hash values matching.

In some circumstances, the currently active key pair may be deprecated. For example, if a particular private key is determined to be compromised, the security management component 120 could determine that the key pair containing the particular private key should be deprecated. More generally, however, one of ordinary skill in the art will recognize that a key pair could be deprecated for a variety of reasons, and such examples are provided for illustrative purposes and without limitation.

FIG. 5 is a flow chart illustrating an alternate method for deprecating a compromised key pair used in a secure boot operation for a device, according to one embodiment described herein. As shown, the method 500 begins at block 510, where the security management component 120 on the device management system 110 determines that a first key pair has been compromised. The security management component 120 selects a second key pair 515 from a plurality of pre-generated key pairs (block 515). For example, such a plurality of pre-generated key pairs could have been generated by a manufacturer of a device, and the corresponding public keys from these key pairs could be stored in a secure memory on the device at the time of manufacture (e.g., while the manufacturer was in control of the device, during an initial setup of the device, etc.).

The security management component 120 signs a first instance of device firmware using both the first key pair as well as the second key pair (block 520) and transmits the signed device firmware to the device 110 (block 525). In one embodiment, the security management component 120 may produce one or more hash digests each time a key pair is used to sign the firmware, and the security management component 120 may include such hash digests together with the firmware when transmitting to the device 110.

Upon receiving the signed new version of firmware, the security management component 160 on the device 110 may install the firmware. During installation of the firmware, the security management component 160 could delete a key pair signature corresponding to the compromised first key pair (block 530). For example, the security management component 160 could delete one or more hash digests received with a firmware package corresponding to the compromised first key pair.

Additionally, the security management component 160 sets the key status of memory location k+1 to active and locks the key status to prevent further modifications (block 535). In this example, memory location k is the location of the compromised first key pair, and thus the security management component 160 is configured to update the key status of the public key stored in the subsequent memory address within the public key storage table. FIG. 4B illustrates an example of this, where the updated exemplary public key storage table 450 contains memory locations $460_{1-n}$, public key values $470_{1-n}$, status values $480_{1-n}$, and key status values $490_{1-n}$. In the depicted embodiment, the security management component 160 has received a new firmware package and has determined to deprecate the currently active public key (i.e., the key in memory location 1) and to set the public key in the subsequent position within the public key storage table to ACTIVE. Thus, the security management component 160 has updated the key status $490_2$, changing the status value from INACTIVE to ACTIVE.

The security management component 160 then reboots the device 110 and verifies that a secure boot operation can successfully validate the new firmware using a signature calculated based on the key pair in the memory location k+1 (block 540), and the method 500 ends. Thus, in the example depicted in FIG. 4B, the security management component 160 could scan the public key storage table 450 in reverse order, starting at memory location n $460_n$, and could determine that the first scanned key having a key status value of ACTIVE is the currently active key, i.e., in the depicted example, the key having a value of ")<~SGVCd3pBD[zl_H-Cank@HuJP.%/hi<cb" in memory location 2 $460_2$. The security management component 160 could then calculate a hash digest using a predefined hashing algorithm and the currently active public key $470_2$ and could compare the calculated hash value with a hash value received together with the new firmware package. Upon determining that the hash values match, the security management component 160 could determine that the new firmware package is successfully verified and validated and could continue with booting from the new firmware package.

Advantageously, the method 500 allows for the device 110 to be recovered and protected in the event the device 110 is ever compromised. That is, even if an attacker were to compromise the private key corresponding to the currently active public key on the device, such an attacker would not be able to incorporate their own key pair into the firmware signing chain since the key pairs are set a-priori (e.g., at the time of manufacture). Thus, even in the event a device is compromised by an attacker, the device could be recovered simply by downloading and installing legitimate firmware on the device.

FIG. 6 is a flow chart illustrating a method for validating firmware using an update key pair, according to one embodiment described herein. As shown, the method 600 begins at block 610, where, when a first firmware package is installed on a first device, the security management component 160 associates a first public key in a first secure memory key location with an active status. The active status generally indicates that the public key will be used during boot operations to validate a signature of the first firmware package on the first device. Responsive to installation of a second firmware package on the first device, the security management component 160 associates a second public key in a second secure memory key location on the first device with an active status (block 615). In one embodiment, the second secure memory key location is immediately adjacent to the first secure memory key location (e.g., index k+1, where k refers to the position of the previously active key).

During a boot-up operation on the first device, the security management component 160 determines to use the second public key to validate the second firmware package by starting at a predefined secure memory key location and scanning backwards until a status of active is identified (block 620). The security management component 160 then validates the second firmware package on the first device using the second public key (block 625), and the method 600 ends.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A system, comprising:
   one or more computer processors;
   a secure memory; and
   a memory comprising computer program code that, when executed by the one or more computer processors, performs a method comprising:
      when a first firmware package is installed on a first device, associating a first public key stored in a first secure memory key location in the secure memory with an active status, the first secure memory key location comprising one or more first memory addresses, the active status indicates that the first public key is to be used during boot operations to validate a signature of the first firmware package on the first device;

responsive to installation of a second firmware package on the first device, associating a second public key stored in a second secure memory key location in the secure memory with the active status, the second secure memory key location comprising one or more second memory addresses of the secure memory that sequentially follow the one or more first memory addresses of the first secure memory key location;

during a boot-up operation on the first device, determining to use the second public key to validate the second firmware package by scanning backwards in the secure memory starting from a predefined memory address until the active status is identified, the predefined memory address being one of the one or more second memory addresses or a third memory address subsequent to the one or more second memory addresses; and validating the second firmware package on the first device using the second public key.

2. The system of claim 1, wherein the second firmware package is signed using a first private key corresponding to the first public key.

3. The system of claim 2, wherein the second firmware package is further signed using a second private key corresponding to the second public key.

4. The system of claim 1, wherein the method further comprises:

responsive to installation of the second firmware package on the first device, associating the first public key in the first secure memory key location on the first device with a deprecated status, such that the second public key will be used to validate a signature of firmware packages during boot operations on the first device rather than the first public key.

5. The system of claim 1, wherein the method further comprises:

upon successful validation of the second firmware package on the first device, continuing the boot-up operation of the first device.

6. The system of claim 1, wherein the method further comprises:

upon unsuccessful validation of the second firmware package on the first device, halting the boot-up operation of the first device and generating a notification.

7. The system of claim 1, wherein the method further comprises, responsive to installation of the second firmware package on the first device, writing the second public key to the second secure memory key location on the first device, wherein the one or more second memory addresses of the second secure memory key location are immediately after the one or more first memory addresses of the first secure memory key location in the secure memory of the first device.

8. The system of claim 7, wherein each secure memory key location within the secure memory of the first device contains at least a public key data field and a key status data field, and wherein associating the second public key in the second secure memory key location on the first device with the active status further comprises writing a data value corresponding to the active status to the key status data field of the second secure memory key location.

9. The system of claim 8, wherein the second secure memory key location is unlocked and wherein the key status data field of the second secure memory key location is set to inactive, prior to:

(a) associating the second public key in the second secure memory key location on the first device with the active status, and (b) writing the data value corresponding to the active status to the key status data field of the second secure memory key location, and wherein the method further comprises upon associating the second public key with the active status and writing the data value to the key status data field of the second secure memory key location, locking the second secure memory key location against further write operations.

10. The system of claim 1, wherein the first and second secure memory key locations are included in a plurality of secure memory key locations within the secure memory of the first device, wherein each of the plurality of secure memory key locations contains a respective public key data field, and wherein each of the public key data fields are locked against write operations after an initial setup of the first device.

11. A method, comprising:

when a first firmware package is installed on a first device, associating a first public key stored in a first secure memory key location in a secure memory of the first device with an active status, the first secure memory key location comprising one or more first memory addresses of the secure memory;

responsive to installation of a second firmware package on the first device, associating a second public key stored in a second secure memory key location in the secure memory on the first device with the active status, the second secure memory key location comprising one or more second memory addresses of the secure memory that sequentially follow the one or more first memory addresses of the first secure memory key location;

during a boot-up operation on the first device, determining to use the second public key to validate the second firmware package by scanning backwards in the secure memory starting from a predefined memory address until the active status is identified, the predefined memory address being one of the one or more second memory addresses or a third memory address subsequent to the one or more second memory addresses; and validating the second firmware package on the first device using the second public key.

12. The method of claim 11, wherein the second firmware package is signed using a first private key corresponding to the first public key.

13. The method of claim 12, wherein the second firmware package is further signed using a second private key corresponding to the second public key.

14. The method of claim 11, further comprising:

responsive to installation of the second firmware package on the first device, associating the first public key in the first secure memory key location on the first device with a deprecated status, such that the second public key will be used to validate a signature of firmware packages during boot operations on the first device rather than the first public key.

15. The method of claim 11, wherein the active status indicates that the first public key will be used during boot operations to validate a signature of the first firmware package on the first device.

16. The method of claim 11, wherein the one or more second memory addresses of the second secure memory key location are immediately adjacent to the one or more first memory addresses of the first secure memory key location.

17. The method of claim 11, further comprising:

upon successful validation of the second firmware package on the first device, continuing the boot-up operation of the first device.

18. The method of claim 11, further comprising:

upon unsuccessful validation of the second firmware package on the first device, halting the boot-up operation of the first device and generating a notification.

19. The method of claim 11, further comprising, responsive to installation of the second firmware package on the first device, writing the second public key to the second secure memory key location on the first device, wherein the one or more second memory addresses of the second secure memory key location are immediately after the one or more first memory addresses of the first secure memory key location in the secure memory of the first device.

20. The method of claim 19, wherein each secure memory key location within the secure memory of the first device contains at least a public key data field and a key status data field, and wherein associating the second public key in the second secure memory key location on the first device with the active status further comprises writing a data value corresponding to the active status to the key status data field of the second secure memory key location.

21. The method of claim 20, wherein the second secure memory key location is unlocked and wherein the key status data field of the second secure memory key location is set to inactive, prior to:

(a) associating the second public key in the second secure memory key location on the first device with the active status, and (b) writing the data value corresponding to the active status to the key status data field of the second secure memory key location, and the method further comprising upon associating the second public key with the active status and writing the data value to the key status data field of the second secure memory key location, locking the second secure memory key location against further write operations.

22. The method of claim 11, wherein the first and second secure memory key locations are included in a plurality of secure memory key locations within the secure memory of the first device, wherein each of the plurality of secure memory key locations contains a respective public key data field, and wherein each of the public key data fields are locked against write operations after an initial setup of the first device.

23. A non-transitory computer-readable medium comprising computer program code that, when executed by one or more computer processors, performs a method comprising:

when a first firmware package is installed on a first device, associating a first public key stored in a first secure memory key location in a secure memory on the first device with an active status, the first secure memory key location comprising one or more first memory addresses of the secure memory;

responsive to installation of a second firmware package on the first device, associating a second public key stored in a second secure memory key location in the secure memory on the first device with the active status, the second secure memory key location comprising one or more second memory addresses of the secure memory that sequentially follow the one or more first memory addresses of the first secure memory key location;

during a boot-up operation on the first device, determining to use the second public key to validate the second firmware package by scanning backwards in the secure memory starting from a predefined memory address until the active status is identified, the predefined memory address being one of the one or more second memory addresses or a third memory address subsequent to the one or more second memory addresses; and upon unsuccessfully validating the second firmware package on the first device using the second public key, halting the boot-up operation of the first device and generating a notification.

* * * * *